United States Patent
Alano

(10) Patent No.: US 10,947,881 B2
(45) Date of Patent: Mar. 16, 2021

(54) REDUCTANT GENERATOR

(71) Applicant: Faurecia Emissions Control Technologies, USA, LLC, Columbus, IN (US)

(72) Inventor: Eduardo Alano, Columbus, IN (US)

(73) Assignee: Faurecia Emissions Control Technologies, USA, LLC, Columbus, IN (US)

( * ) Notice: Subject to any disclaimer, the term of this patent is extended or adjusted under 35 U.S.C. 154(b) by 27 days.

(21) Appl. No.: 16/275,609

(22) Filed: Feb. 14, 2019

(65) Prior Publication Data

US 2020/0263582 A1  Aug. 20, 2020

(51) Int. Cl.
| | |
|---|---|
| *F01N 3/035* | (2006.01) |
| *F01N 3/20* | (2006.01) |
| *F02B 37/04* | (2006.01) |

(52) U.S. Cl.
CPC ............. *F01N 3/208* (2013.01); *F01N 3/035* (2013.01); *F01N 3/2066* (2013.01); *F01N 3/2073* (2013.01); *F02B 37/04* (2013.01)

(58) Field of Classification Search
CPC ........ F01N 3/035; F01N 3/103; F01N 3/2066; F01N 3/208; F02B 33/06; F02B 37/04
See application file for complete search history.

(56) References Cited

U.S. PATENT DOCUMENTS

| | | | |
|---|---|---|---|
| 8,371,256 B2 | 2/2013 | Durrett et al. | |
| 2017/0030247 A1* | 2/2017 | Suetou | ................... B60K 13/04 |
| 2019/0178152 A1* | 6/2019 | Andersson | ............ F01N 3/2066 |

FOREIGN PATENT DOCUMENTS

| | | | | |
|---|---|---|---|---|
| WO | 2017102813 A2 | 6/2017 | | |
| WO | 2018054490 A1 | 3/2018 | | |
| WO | WO-2019201411 A1 * | 10/2019 | ............. | F02B 41/06 |

* cited by examiner

*Primary Examiner* — Audrey K Bradley
(74) *Attorney, Agent, or Firm* — Carlson, Gaskey & Olds, P.C.

(57) ABSTRACT

A reductant generator includes a housing defining a chamber, an inlet to direct engine exhaust gas into the chamber, a moveable member that receives driving input from an engine and which is configured to compress engine exhaust gases within the chamber, and a supply to provide a fluid into the chamber to be transformed into reductant. The generator also includes an outlet from which the reductant is directed into an exhaust system.

18 Claims, 4 Drawing Sheets

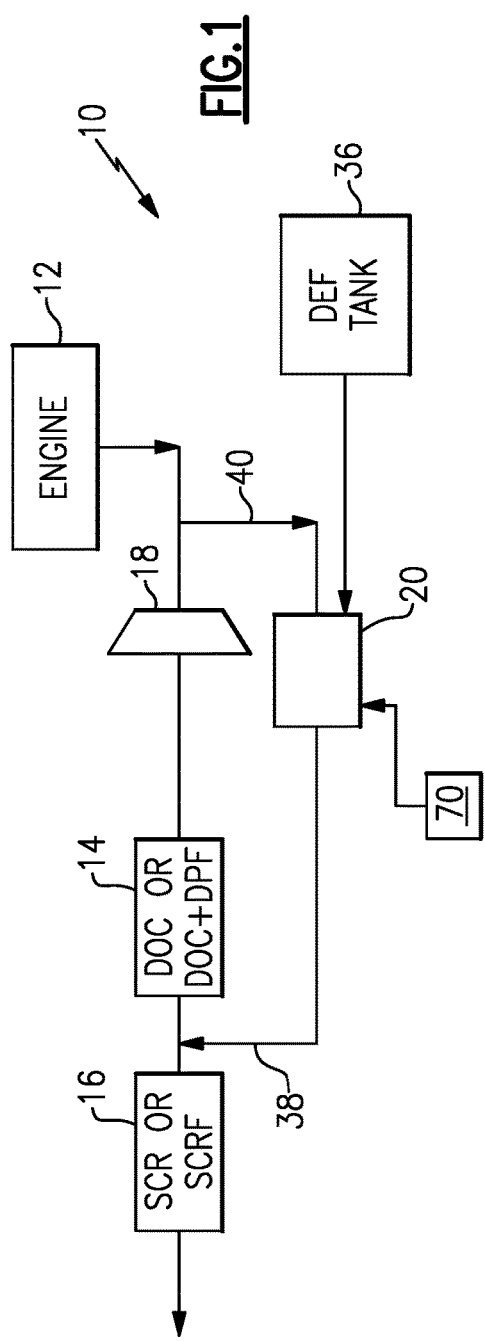
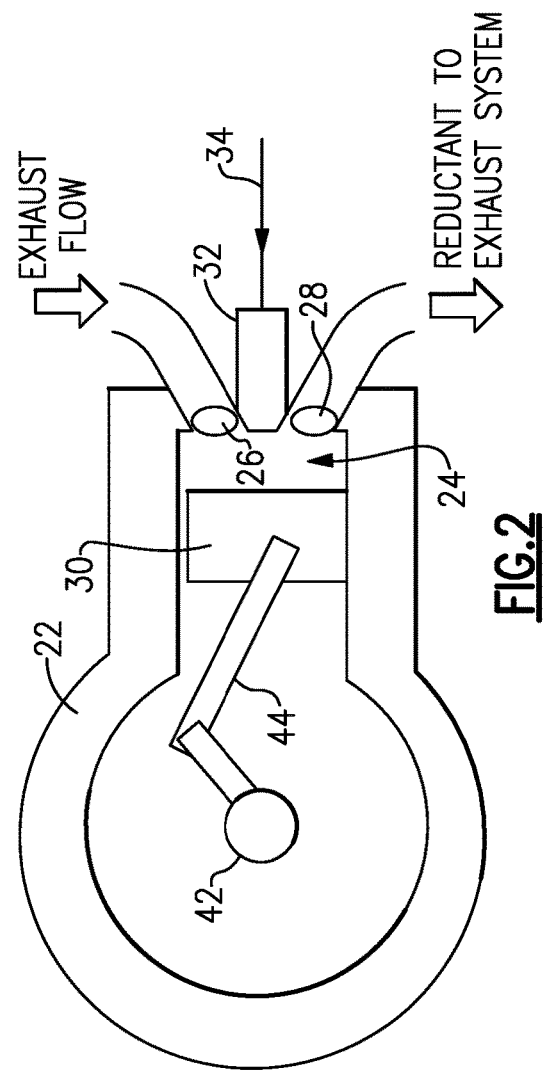

REDUCTANT GENERATOR

TECHNICAL FIELD

The subject invention relates to a method and apparatus for a reductant generator as used in a vehicle exhaust system.

BACKGROUND OF THE INVENTION

An exhaust system conducts hot exhaust gases generated by an engine through various exhaust components to reduce emissions such as nitrogen oxides NOx, for example. The exhaust system includes an injection system that injects fluid, for example a reductant solution of urea and water such as a diesel exhaust fluid (DEF) or gaseous ammonia, upstream of a selective catalytic reduction (SCR) catalyst to mix with an exhaust gas stream. For example, when DEF is injected into the exhaust gas stream it vaporizes and decomposes to form ammonia and carbon dioxide. The ammonia is then introduced into the SCR catalyst, which then converts the NOx into nitrogen and water. Unfortunately, under certain low temperature conditions, not all of the injected fluid vaporizes, which can lead to deposit formation. The deposits in the exhaust system can build up over time, which reduces operating efficiency.

SUMMARY OF THE INVENTION

In one exemplary embodiment, a reductant generator includes a housing defining a chamber, an inlet to direct engine exhaust gas into the chamber, a moveable member receiving driving input from an engine and configured to compress engine exhaust gases within the chamber, a supply to provide a fluid into the chamber to be transformed into reductant, and an outlet from which the reductant is directed into an exhaust system.

In a further embodiment of the above, the inlet comprises an intake port with an intake valve.

In a further embodiment of any of the above, the outlet comprises an exhaust port with an exhaust valve.

In a further embodiment of any of the above, the moveable member comprises a piston that is coupled to an engine shaft.

In a further embodiment of any of the above, the supply comprises a doser or injector that receives the fluid from a supply line that is connected to a supply tank for the fluid.

In a further embodiment of any of the above, the moveable member comprises a piston that is movable through a reductant generation cycle that includes an exhaust gas intake, a compression, an injection of fluid, and a reductant release.

In a further embodiment of any of the above, the inlet includes an intake valve and the outlet includes an exhaust valve, and during the exhaust gas intake, the intake valve is open, the exhaust valve is closed, and the piston is moving to increase a volume of the chamber, during the compression, the intake valve is closed, the exhaust valve is closed, and the piston is moving to decrease the volume of the chamber and increase the temperature inside the chamber, during the injection of fluid, the intake valve is closed, the exhaust valve is closed, the fluid is injected into the chamber, and the piston initiates movement to increase the volume of the chamber which transforms the fluid into reductant, and during the reductant release, the intake valve is closed, the exhaust valve is open, and the piston is moving to decrease the volume of the chamber exhaust the reductant.

In another exemplary embodiment, a vehicle exhaust system includes a first exhaust component positioned downstream of an engine, a second exhaust component positioned downstream of the first exhaust component, and a reductant generator. The reductant generator comprises a housing defining a chamber, an intake valve to direct engine exhaust gas into the chamber, a piston receiving driving input from the engine and configured to compress engine exhaust gases within the chamber, a doser or injector to provide a fluid into the chamber to be transformed into reductant, and an exhaust valve from which the reductant is directed into an injection point that is downstream of the first exhaust component and upstream of the second exhaust component.

In a further embodiment of any of the above, the first exhaust component comprises a DOC or DOC/DPF and wherein the second exhaust component comprises a SCR or SCRF, and including a turbine downstream of the engine and upstream from the first exhaust component, and wherein the intake valve receives engine exhaust gases from a connection upstream of the turbine and the exhaust valve directs the reductant to the injection point.

In an exemplary method of generating a reductant includes: drawing engine exhaust gases into a chamber; compressing the engine exhaust gases to increase a temperature within the chamber; injecting a fluid into the chamber after the temperature has increased to transform injected fluid into a reductant; and directing the reductant from the chamber to an exhaust system.

These and other features may be best understood from the following drawings and specification.

BRIEF DESCRIPTION OF THE DRAWINGS

FIG. 1 is a schematic diagram of a vehicle exhaust system with a reductant generator incorporating the subject invention.

FIG. 2 is a schematic representation of the reductant generator of FIG. 1.

DETAILED DESCRIPTION

Figure 3:
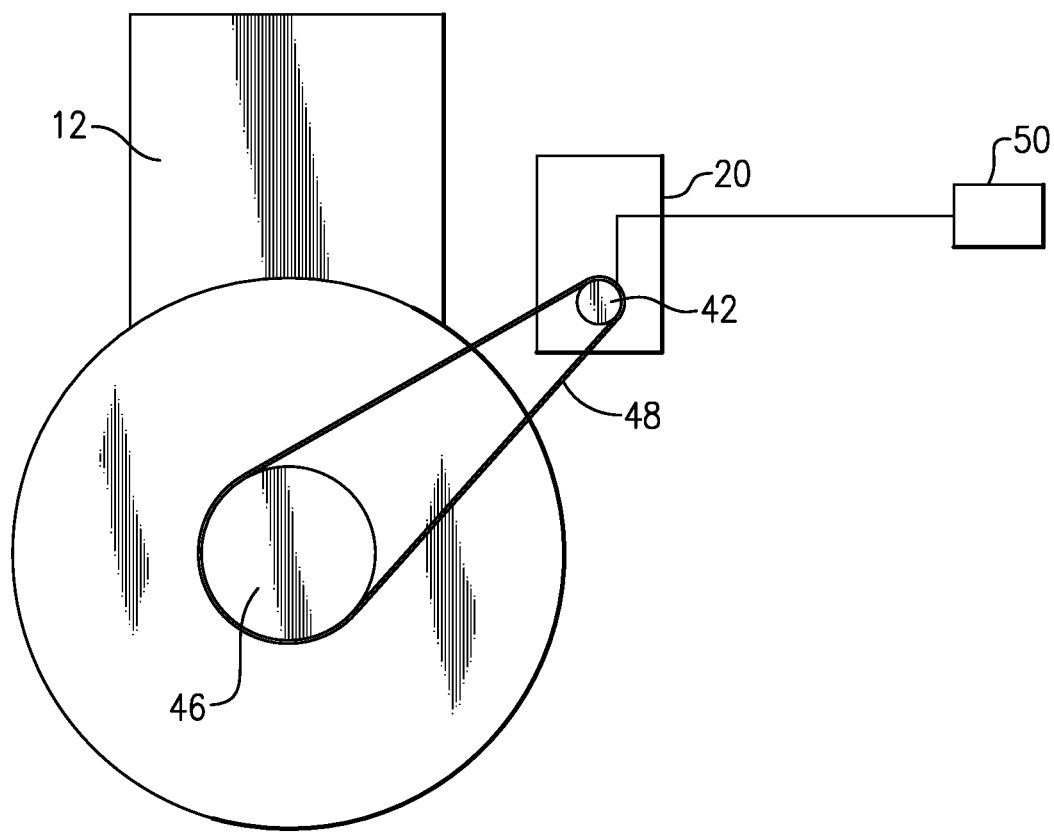
FIG. 3 is a schematic diagram of one example of a coupling element to connect an engine to the reductant generator.

FIG. 1 shows an exhaust system 10 that conducts hot exhaust gases generated by an engine 12 through various exhaust components to reduce emissions such as nitrogen oxides NOx, for example. In one example configuration, the exhaust system includes at least a first exhaust component 14 that is positioned downstream of the engine 12 and a second exhaust component 16 that is positioned downstream of the first exhaust component 14. In one example, the first exhaust component comprises a diesel oxidation catalyst (DOC) or a combination of a DOC and a diesel particulate filter (DPF), and the second exhaust component comprises a selective catalytic reduction (SCR) or SCR with a filter (SCRF). In one example, the exhaust system 10 may also include a turbine 18 from a turbocharger that is downstream of the engine 12 and upstream from the first exhaust component 14.

The exhaust system 10 includes a reductant generator 20 that injects fluid essentially composed of ammonia gas upstream of the second exhaust component 16, e.g. the selective catalytic reduction (SCR) catalyst, to mix with an exhaust gas stream. One example of the reductant generator 20 is shown in FIG. 2. In this example, the reductant generator 20 includes a housing 22 defining a chamber 24, an inlet with an intake valve 26 to direct engine exhaust gas into the chamber 24, and an outlet with an exhaust valve 28 to direct reductant out of the chamber 24. Any type of valve structure can be used for the intake 26 and exhaust 28 valves.

A moveable member receives driving input from the engine 12 and is configured to compress engine exhaust gases within the chamber 24. In one example, the moveable member comprises a piston 30 that is moveable within the housing 22 through a reductant generation cycle. The piston 30 is driven by the engine 12 to compress engine exhaust gases within the chamber 24, which in turn increases the temperature inside the chamber 24. While a piston 30 is shown as one example of a moveable member, it should be understood that other structures could be used to compress the exhaust gases within the chamber 24.

The reductant generator 20 also includes a supply to provide the fluid into the chamber 24 to be transformed into reductant. In one example, the intake valve 26 receives engine exhaust gases from a connection point 40 that is upstream of the turbine 18 and directs the exhaust gases into the chamber 24 where they can mix with the injected fluid. In one example, a doser or injector 32 provides the fluid into the chamber 24 via a supply line 34 that receives the fluid from a supply tank 36. The structure of the doser and/or injector is known and will not be discussed in greater detail. In one example, the fluid comprises DEF and after the piston 30 has compressed the exhaust gases causing the temperature within the chamber 24 to increase, the DEF is injected into the heated chamber where it is transformed into ammonia. This will be discussed in greater detail below. The ammonia is then released from the chamber 24 via the exhaust valve 28 and is directed into an injection point 38 that is downstream of the first exhaust component 14 and upstream of the second exhaust component 16.

The connection point 40 for the intake valve 26 could optionally be located downstream of the turbine 18. However, it is preferable to have the connection point 40 upstream of the turbine 18 to take advantage of higher temperatures of exhaust flow at this location.

The piston 30 is coupled to a generator shaft 42 with a linkage 44 or other connecting element. The generator shaft 42 is coupled to an engine output shaft 46 via a coupling element 48 as shown in FIG. 3. In one example, the coupling element comprises a belt drive that is connected to the generator shaft 42 in a manner that is similar to an air conditioning compressor; however, other coupling elements such as a gear drive mechanism or other driving element, for example, could also be used. Optionally, a clutch 50 could be located between the coupling element 48 and the generator shaft 42 to control reductant generation independent of engine speed.

Figure 4A:
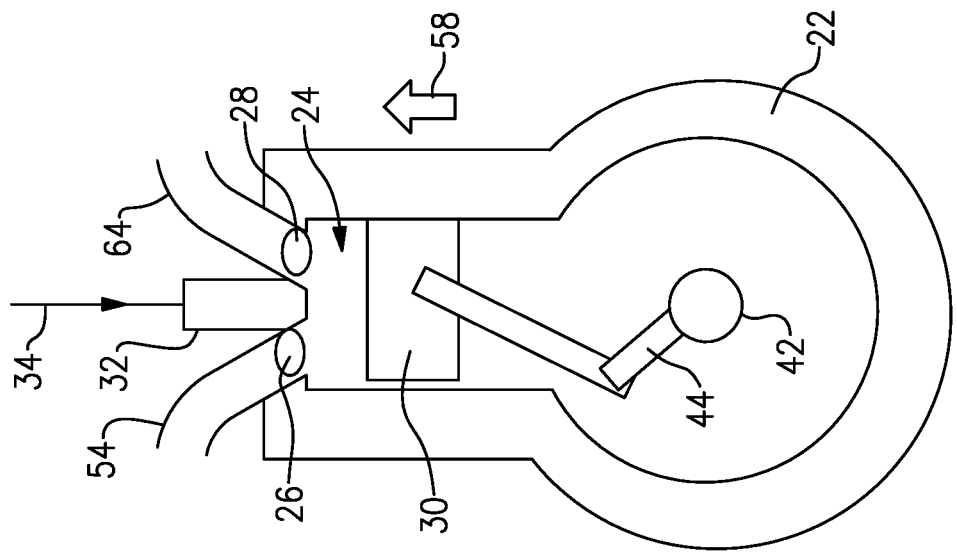
FIG. 4A is a schematic representation of a piston of the reductant generator in an intake position of a reductant generation cycle.
Figure 4B:
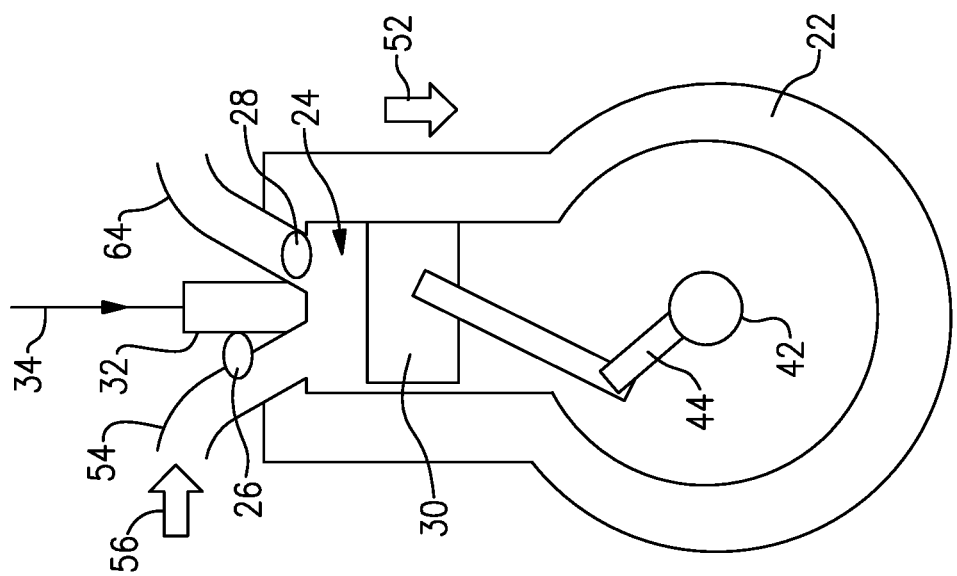
FIG. 4B is the piston of FIG. 4A in a compression position of the reductant generation cycle.
Figure 4D:
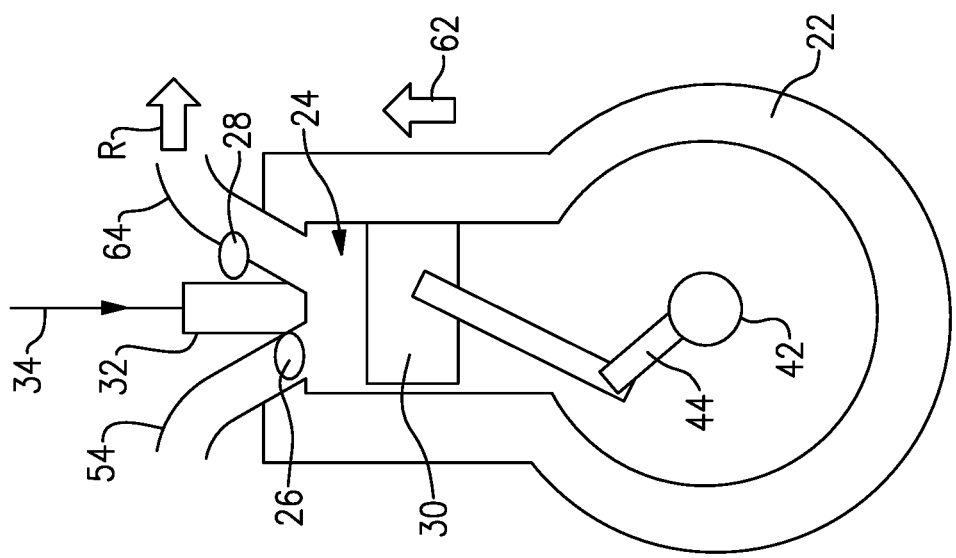
FIG. 4D is the piston of FIG. 4A in a reductant release position of the reductant generation cycle.
Figure 4C:
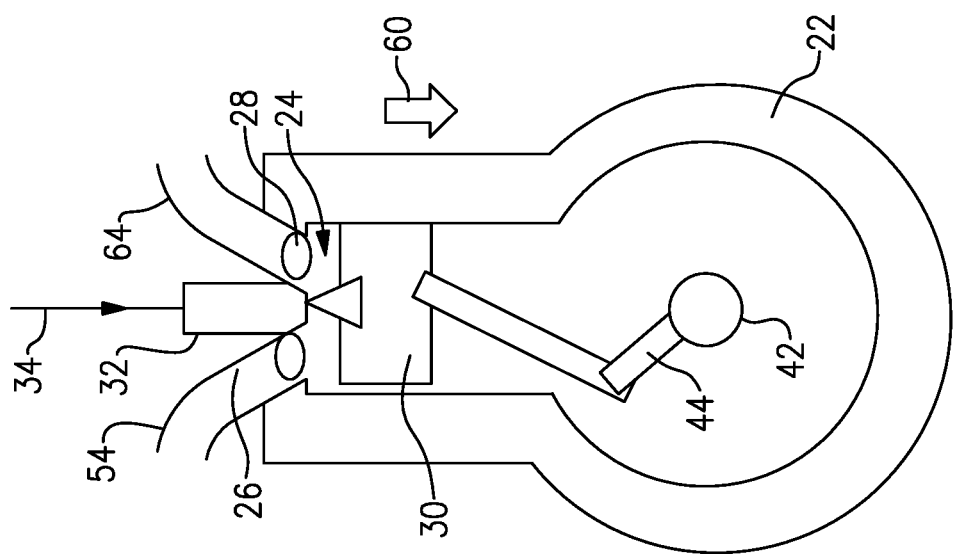
FIG. 4C is the piston of FIG. 4A in an injection position of the reductant generation cycle.

The piston 30 of the reductant generator 20 is movable through a reductant generation cycle that includes the following progression: an exhaust gas intake (FIG. 4A), a compression (FIG. 4B), an injection of fluid (FIG. 4C), and a reductant release (FIG. 4D). During the exhaust gas intake, the intake valve 26 is open, the exhaust valve 28 is closed, and the piston 30 is moving to increase a volume of the chamber 24 as indicated by the arrow 52. This draws exhaust gases into an intake port 54 that is associated with the intake valve 26 as indicated by arrow 56. During the compression, the intake valve 26 is closed, the exhaust valve 28 is closed, and the piston 30 is moving to decrease the volume of the chamber 24 (see arrow 58) and increase the temperature inside the chamber 24. Close to the top dead center (TDC) of the piston movement, the fluid F is injected into the chamber 24. At the end of the injection event of fluid F, the intake valve 26 is closed, the exhaust valve 28 is closed, and the piston 30 initiates movement to increase the volume of the chamber 24 (see arrow 60) resulting in the transformation of the fluid into reductant. During the reductant release, the intake valve 26 is closed, the exhaust valve 28 is open, and the piston 30 is moving to decrease the volume of the chamber 24 (see arrow 62) and exhaust the reductant R via an exhaust port 64 that is associated with the exhaust valve 28.

The system includes a controller 70 (FIG. 1), such as an electronic control unit (ECU) for example, which controls the injection of the fluid F. Any type of controller 70 can be used. The controller 70 can be a dedicated controller, or can be incorporated as part of the engine controller. The controller 70 can also be used to control the clutch 50 as needed to control reductant generation independent of engine speed.

Thus, the subject invention provides a reductant generator 20 where a fluid, such as DEF for example, is injected and reductant is generated that can be introduced as ammonia in an after-treatment system. Exhaust flow is sucked into the chamber 24 when the piston 30 is performing an intake stroke and the intake valve 26 is open. When the piston 30 reaches the bottom dead center (BDC) of the stroke, the intake valve 26 closes and the piston 30 moves toward the TDC of the next stroke, which will result in heating of the exhaust gas by adiabatic compression. Just before the TDC of the stroke, DEF is injected into the very hot chamber 24, e.g. around 500 degrees Celsius, which will lead to DEF transformation. At this point the mixture will remain in the chamber 24 until the piston 30 is close to reaching the subsequent TDC where the exhaust valve 28 will open and the mixture will leave the chamber 24. At this point, the intake valve 26 opens and another cycle starts.

In one example, at every two rotations of the shaft 42, one DEF injection event happens. The maximum temperature in the chamber 24 depends on the compression ratio of the chamber 24. For example, if the target temperature is 500 degrees Celsius, a compression ratio of 11 or 12 should suffice (see example below). The piston 30 has a low heat capacity such that during the compression stroke, the piston 30 can heat up with the exhaust gas. The injected DEF spray will hit a bowl of the piston 30, so it is desirable to have a sufficiently high temperature at this area. This invention will have a major benefit because the reductant generator 20 provides higher dosing event frequency compared to traditional 1 Hz dosing. This will lead to a lower dosing amount per injection and therefore a reduced risk of deposit formation.

In one example, the compression stroke frequency is 2000 rpm÷2, which is approximately 15 times per second. At each compression stroke there is a DEF injection event. Because there will be 15 compression strokes in one second, the amount of DEF injected will be divided by 15. The compression ratio will therefore have to be 11 or 12 to heat the exhaust flow temperature in the chamber to around 500 degrees Celsius. Thus, the frequency of compression strokes will be approximately 15 strokes if the generator is running at 2000 rpm, and the amount of DEF in each injection event will be 15 times smaller, which results in better deposit management. Further, the transformation of DEF into NH3/reductant will occur in the chamber 24 during compression which will heat the exhaust gas to 500 degrees Celsius even when exhaust temperatures coming out from the engine are relatively cool, e.g. 150-200 degrees Celsius. Thus, this will increase availability of NH3 at cool temperatures.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A reductant generator comprising:
a housing defining a chamber;
an inlet to direct engine exhaust gas into the chamber;
a piston or moveable member receiving driving input from an engine and configured to compress engine exhaust gases within the chamber;
a doser or injector to provide a fluid into the chamber to be transformed into reductant;
an outlet from which the reductant is directed into an exhaust system; and
a turbine downstream of the engine and a first exhaust component downstream of the turbine, and wherein the inlet receives engine exhaust gases from a connection upstream of the turbine and the outlet directs the reductant to an injection point that is downstream of the turbine and upstream of the first exhaust component.

2. The reductant generator according to claim 1, wherein the inlet comprises an intake port to receive engine exhaust gas via an intake valve that is operated independently of injection of the fluid into the chamber via a fluid inlet such that during an injection cycle, fluid can be injected into the chamber via the fluid inlet when the intake valve is closed.

3. The reductant generator according to claim 1, wherein the outlet comprises an exhaust port with an exhaust valve.

4. The reductant generator according to claim 1, wherein the piston or moveable member is coupled to an engine shaft.

5. The reductant generator according to claim 1, wherein the doser or injector receives the fluid from a supply line that is connected to a supply tank for the fluid.

6. The reductant generator according to claim 1, wherein the first exhaust component comprises a SCR or SCRF, and wherein the reductant includes ammonia.

7. The reductant generator according to claim 6, including a second exhaust component upstream of the injection point and downstream of the turbine, wherein the second exhaust component comprises a DOC or DOC/DPF.

8. The reductant generator according to claim 1, wherein the piston or moveable member is movable through a reductant generation cycle that includes an exhaust gas intake, a compression, an injection of fluid, and a reductant release.

9. The reductant generator according to claim 8, wherein the inlet includes an intake valve and the outlet includes an exhaust valve, and during the exhaust gas intake, the intake valve is open, the exhaust valve is closed, and the piston or moveable member is moving to increase a volume of the chamber,
during the compression, the intake valve is closed, the exhaust valve is closed, and the piston or moveable member is moving to decrease the volume of the chamber and increase the temperature inside the chamber,
during the injection of fluid, the intake valve is closed, the exhaust valve is closed, the fluid is injected into the chamber, and the piston or moveable member initiates movement to increase the volume of the chamber which transforms the fluid into reductant, and
during the reductant release, the intake valve is closed, the exhaust valve is open, and the piston or moveable member is moving to decrease the volume of the chamber exhaust the reductant.

10. The reductant generator according to claim 8, wherein the piston or moveable member is connected to a generator shaft via a linkage, and wherein the generator shaft is coupled to an engine output shaft.

11. A vehicle exhaust system comprising:
a first exhaust component positioned downstream of an engine, wherein the first exhaust component comprises a DOC or DOC/DPF;
a second exhaust component positioned downstream of the first exhaust component, wherein the second exhaust component comprise a SCR or SCRF;
a reductant generator that comprises
a housing defining a chamber, wherein the housing includes a fluid inlet,
an intake valve associated with an exhaust gas inlet to the housing to direct engine exhaust gas into the chamber, the exhaust gas inlet being separate from the fluid inlet,
a piston receiving driving input from the engine and configured to compress engine exhaust gases within the chamber,
a doser or injector to provide a fluid into the chamber via the fluid inlet to be transformed into reductant, and
an exhaust valve from which the reductant is directed into an injection point that is downstream of the first exhaust component and upstream of the second exhaust component; and
a turbine downstream of the engine and upstream from the first exhaust component, and wherein the intake valve receives engine exhaust gases from a connection upstream of the turbine and the exhaust valve directs the reductant to the injection point.

12. The vehicle exhaust system according to claim 11, wherein the piston is connected to a generator shaft via a linkage, and wherein the generator shaft is coupled to an engine output shaft via a coupling element.

13. The vehicle exhaust system according to claim 11, wherein the fluid comprises DEF and the reductant includes ammonia.

14. The vehicle exhaust system according to claim 11, wherein the exhaust gas inlet comprises an intake port with intake valve that is operated independently of injection of the fluid into the chamber such that during an injection cycle, fluid can be injected into the chamber via the fluid inlet when the intake valve is closed.

15. The vehicle exhaust system according to claim 11, wherein the piston is movable through a reductant generation cycle that includes an exhaust gas intake, a compression, an injection of fluid, and a reductant release.

16. The vehicle exhaust system according to claim 15, wherein
during the exhaust gas intake, the intake valve is open, the exhaust valve is closed, and the piston is moving to increase a volume of the chamber, during the compression, the intake valve is closed, the exhaust valve is closed, and the piston is moving to decrease the volume of the chamber and increase the temperature inside the chamber, during the injection of fluid, the intake valve is closed, the exhaust valve is closed, the fluid is injected into the chamber, and the piston initiates movement to increase the volume of the chamber which transforms the fluid into reductant, and during the reductant release, the intake valve is closed, the exhaust valve is open, and the piston is moving to decrease the volume of the chamber and exhaust the reductant to the injection point.

17. A method of generating a reductant comprising:

providing a piston that is movable through a reductant generation cycle that includes an exhaust gas intake, a compression, an injection of fluid, and a reductant release;

drawing engine exhaust gases into a chamber;

compressing the engine exhaust gases to increase a temperature within the chamber;

injecting a fluid into the chamber after the temperature has increased to transform injected fluid into a reductant; and directing the reductant from the chamber to an exhaust system;

including providing the chamber with an intake valve and an exhaust valve, and during the exhaust gas intake, opening the intake valve, closing the exhaust valve, and moving the piston to increase a volume of the chamber, during the compression, closing the intake valve, closing the exhaust valve, and moving the piston to decrease the volume of the chamber and increase the temperature inside the chamber, during the injection of fluid, closing the intake valve, closing the exhaust valve, injecting the fluid into the chamber, and initiating movement of the piston to increase the volume of the chamber and transform the fluid into reductant, and during the reductant release, closing the intake valve, opening the exhaust valve, and moving the piston to decrease the volume of the chamber and exhaust the reductant to the exhaust system.

18. The method according to claim 17 including an exhaust gas inlet associated with the intake valve, and including operating the intake valve independently of injection of the fluid into the chamber via a fluid inlet such that during an injection cycle, fluid can be injected into the chamber via the fluid inlet when the intake valve is closed.

* * * * *